Patented Feb. 10, 1942

2,272,742

UNITED STATES PATENT OFFICE 2,272,742

MOLDING COMPOSITION AND MOLDED PRODUCT

Edmond F. Fiedler, Adams, Mass., assignor to General Electric Company, a corporation of New York No Drawing. Application June 8, 1938, Serial No. 212,501

11 Claims. (Cl. 260—10)

This invention relates to plastic molding compositions and molded products, and to processes of making the same. The invention is especially concerned with molding compositions of the type which comprise an acid- or alkaline-catalyzed hydrolyzed vegetable fibrous material, for example hydrolyzed wood. More particularly my invention relates to the preparation of molding compositions by suitably incorporating a potentially reactive (potentially hardening) phenol-aldehyde resin, as well as other addition agents, with hydrolyzed vegetable fibrous material. In accordance with a preferred embodiment of my invention these addition agents comprise at least one lignin-reactable organic compound selected from the group consisting of phenols, alcohols, aldehydes and aromatic amines. Mixtures comprising any two or more of the said lignin-reactable compounds also may be used. The potentially hardening phenol-aldehyde resin is advanced to the infusible, insoluble state concomitantly with the formation of a reaction product of the added phenol, aldehyde, aromatic amine, or mixture thereof, with the hydrolyzed wood, and specifically with reactive substances therein such as lignin.

The plastic compositions of this invention cure rapidly under heat and pressure to form hard, strong, infusible products. The molded articles have a good appearance and, in general, are comparable with products made by incorporating fillers such as wood flour into conventional phenol-formaldehyde resins and hardening the resulting mass under heat and pressure.

Various investigators heretofore have proposed that molding compositions be prepared by treating vegetable fibrous materials with different reactants in various ways. Hard resinous masses generally have resulted by heating the treated product in a steam-heated mold under substantial pressure at a temperature of 120° to 175° C. for from 3 or 4 up to 20 minutes. Such products usually have necessitated material cooling of the mold in order to extract the molded mass. As a result, when such compositions are molded the production capacity of the molding presses is limited and costs of the molded articles are correspondingly increased. Further, the materials heretofore produced from treated vegetable fibers have had very low mechanical strength.

It is a principal object of the present invention to improve the properties of molding compositions containing active or latent reaction products of treated vegetable fibrous materials, specifically hydrolyzed wood, so that strong molded articles of good appearance can be made rapidly and economically therefrom, without any particular cooling step after molding, and with standard molding equipment now in common use in the art.

In carrying my invention into effect I proceed, for example, as follows:

A suitable amount of lignin-cellulose material such for example as wood flour, together with water and a small amount of mineral acid such as sulfuric acid, is charged into an autoclave. Any suitable amount of water may be employed, but usually an amount corresponding to from two to three times the weight of the lignin-cellulose material will provide a mixture which conveniently and effectively can be hydrolyzed. Likewise, the amount of mineral acid may be varied and may be, for instance, from ½ to 10 per cent by weight of the lignin-cellulose material. The amount of acid used will depend to a large extent upon the particular acid employed and the degree of hydrolysis desired.

When the lignin-cellulose material is wood flour, best results have been obtained using the following formula:

| | Parts by weight |
|---|---|
| Wood flour | 100 |
| Sulfuric acid (66° Bé.) | 1.2 |
| Water | 250 |

The mass is heated under a steam pressure of about 50 to 60 pounds, which provides a temperature of approximately 145° to 150° C. Hydrolysis of the wood is allowed to proceed under these conditions to the point at which the desired relation of fibre to reactive lignin exists. This will occur after approximately two hours' digestion under the specified conditions. The mass is cooled and removed from the autoclave. It consists of a light to dark brown finely divided sludge of increased acidity over the original acid mass. This sludge is filtered and washed to remove the excess acid and the sugars produced by the hydrolyzing action of the acid solution. It is dried by any suitable means to a moisture content of about 10 to 20 per cent.

Alternatively, instead of hydrolyzing the lignin-cellulosic material by digestion with a mineral acid, a suitable alkaline reagent may be used. Preferably, I use an aromatic amine such, for instance, as aniline. When wood flour is the particular lignin-cellulosic material employed, best results have been obtained using the following formula:

| | Parts by weight |
|---|---|
| Wood flour | 100 |
| Aniline | 20 |
| Water | 250 |

Hydrolysis is carried out as described above in connection with the acid-digestion method, but preferably at a somewhat higher temperature and pressure, for instance under a steam pressure of 150 to 160 pounds, which provides a temperature of approximately 180° to 185° C. A substantial proportion of the aniline is retained in bound state with the lignin of the wood. The subsequent operations are essentially the same as in the other method of treatment.

It has been suggested heretofore to make molding compositions from such hydrolyzed masses by incorporating therewith aldehydes such as furfural, or aromatic amines such as aniline, or phenols, or mixtures of such reagents. The resulting compositions, however, even with the addition of plasticizer, mold lubricant and unhydrolyzed wood flour, are unable to meet the requirements of a modern thermosetting molding material. Such compounds cannot be removed successfully from a mold unless cooled. This interferes with high-speed production cycles. Further, the finished compounds are deficient in mechanical strength.

To make practically useful moldable masses from the dried hydrolyzed materials I have found that it is necessary further to modify them. More particularly it may be stated that as a result of extensive research work I have discovered that a molding material adapted to meet practical manufacturing requirements can be made from hydrolyzed wood by incorporating therewith a separately prepared, potentially hardening phenol-aldehyde resin. I prefer to use, since by its use best results have been obtained, an aqueous resinous composition obtained by reacting a phenol and an aqueous solution of an excess of aldehyde, specifically formaldehyde, in the presence of an alkaline catalyst for a period insufficient to cause separation of the mass into distinct resinous and aqueous layers. More specifically, I prefer to incorporate with the hydrolyzed mass an aqueous resinous composition prepared as described in the co-pending application of George Alexander, Serial No. 94,800, filed August 7, 1936, now Patent No. 2,218,373, and assigned to the same assignee as the present invention.

It was further found that in addition to incorporating reagents such as phenol, furfural or aniline, or mixtures thereof, with the phenolic-resin-modified hydrolyzed wood, it is advantageous to incorporate also such substances as alcohols, for example dihydric alcohols such as ethylene glycol, or trihydric alcohols as for instance glycerol, which is the preferred alcohol. Such alcohols in an uncombined state or in chemical combination with the lignin of the hydrolyzed wood improve the molding properties, for instance flow or plasticity, of the molding compositions of the invention. Also effective in improving the plasticity of the composite mass are esters such as dimethyl phthalate, diethyl phthalate, dibutyl phthalate, diphenyl phthalate, tributyl borate, triamyl borate, amyl stearate, amyl lactate, ethyl abietate, butyl benzoyl benzoate, etc., and ketones such as acetone, cyclohexanone, etc.

It was also found that it is especially desirable to compact the mixture of hydrolyzed wood and addition agents, and to regrind the compacted material prior to molding in order to obtain a suitably dense material. This is accomplished by working the blended mass on hot rolls into the form of a sheet, which is cooled and ground.

Essentially, however, the present invention resides in the discovery of the unexpected improvement in the properties of the active or the latent resinous reaction product of a phenol, an aldehyde or an aromatic amine with hydrolyzed wood, which improvement is obtained by effecting the said reaction in the presence of a potentially reactive resin which simultaneously is being advanced to the infusible, insoluble state. By so doing, a plastic molding composition is produced which cures rapidly under heat and pressure to a hard, infusible condition. The molded article can be removed from the mold without cooling. Its mechanical strength, expecially flexural strength, is surprisingly high as compared with hydrolyzed-wood molding materials which are not modified in the manner of the present invention, and is far above expectations.

The minimum amount of phenolic resin required to attain the above results is critical. It must be at least 10 per cent by weight of the net dry hydrolyzed wood. Any larger percentage proportion may be used, but from an economical standpoint little is gained when the amount of phenolic resin exceeds substantially 60 per cent by weight of the net dry hydrolyzed wood. By using the phenolic resin in its initial stage of reaction and when it comprises mainly phenol alcohols, cured products are obtained which are better from the standpoint of mechanical strength than when a so-called dry potentially reactive phenol-formaldehyde resin is employed. Ordinarily I use an aqueous solution of phenolic resin in an amount by weight, based on the dry resin, corresponding to from 10 to 35 per cent of the net dry hydrolyzed wood.

Best results are obtained by incorporating with the hydrolyzed wood, in addition to the potentially reactive phenolic resin, a minor but substantial amount, by weight of the hydrolyzed wood, of a modifying agent comprising a phenol, for example $C_6H_5OH$, cresols, or a mixture of $C_6H_5OH$ and one or more cresols, etc., or an aldehyde such as furfural, etc., or an aromatic amine such as aniline, etc., or mixtures containing two or more such modifying agents. In general, the desired improvement in plasticity and in other properties of the molding composition and of the molded article are obtained by using such reagents, or mixtures thereof, in an amount corresponding to from approximately 5 to 20 per cent by weight of the net dry hydrolyzed wood. I prefer to use furfural, aniline, or mixtures thereof, in thus further modifying the hydrolyzed wood.

In order that those skilled in the art better may understand how the present invention may be carried into effect, the following specific examples thereof are given:

EXAMPLE 1

A potentially reactive phenolic resin is prepared, for example, as follows:

Resin A

| | Parts by weight |
|---|---|
| 82% phenol, remainder mainly cresol | 600 |
| Aqueous solution of formaldehyde (37½%) | 480 |
| Sulfuric acid (in 97 parts water) | 4.04 |
| Calcium hydroxide (in 50 parts water) | 6.7 |

The phenol and formaldehyde are reacted together in the presence of the sulfuric acid by boiling (94° to 98° C.) under reflux for 1 hour. The resinous mass is dehydrated under vacuum and neutralized at a particular stage in the vacuum-dehydration process as described in my co-pending application Serial No. 150,376, filed June 25, 1937, now Patent No. 2,180,981, and assigned to the same assignee as the present invention. More particularly it may be stated that the lime dispersed in the water preferably is added when 82 per cent of the total water initially present, or formed during the reaction, has been removed. Dehydration of the neutralized resin is continued until the resinous mass reaches a temperature of approximately 105° to 110° C., or until the resin has a flow point of about 95° to 100° C.

Resin B

Essentially the same formula and procedure is employed as described above with reference to resin A, with the exception that the phenolic body is cresol.

Compound C

| | Parts by weight (approximately) |
|---|---|
| Resin A | 85.8 |
| Resin B | 3.2 |
| Hexamethylene tetramine | 7.2 |
| Calcium hydroxide | 1.6 |
| Calcium stearate | 0.5 |
| Talc | 1.7 |

The resins are ground with the other ingredients and then screened to the desired particle size. The resulting finely divided powder fuses or melts at a temperature above 110° C. and is converted to the hard, infusible state when molded under heat and pressure in accordance with conventional practice.

The following is illustrative of a suitable formula for making a practically useful molding composition from aniline-hydrolyzed wood, the aniline being used in effecting hydrolysis in an amount corresponding to about 20 per cent by weight of the wood:

| | Parts by weight |
|---|---|
| Aniline-hydrolyzed wood (containing approximately 19% moisture) | 200 (net dry) |
| Compound C | 50 |
| Wood flour (containing approximately 6½% moisture) | 100 (net dry) |
| Furfural | 16 |
| Dye (nigrosine) | 8 |
| Hardening agent (preferably calcium hydroxide) | 1 to 2 |
| Mold lubricant (preferably calcium stearate) | 1 to 2 |

Instead of calcium hydroxide, other inorganic alkaline substances may be used as, for example, the hydroxides of barium, strontium or magnesium. Likewise, metallic soaps other than calcium stearate may be employed, for instance, the stearates or palmitates of barium, strontium, aluminum, zinc, magnesium, etc. In certain cases the mold lubricant, or the hardening agent, or both, may be omitted.

The above ingredients are ball-milled together for approximately 3 hours. The resulting mass is milled on rolls at 110° to 115° C. for about 10 to 15 seconds to densify the mass, to further the reaction between the furfural and the hydrolyzed wood, and to advance the phenolic-resin component of compound C toward the infusible, insoluble state. The sheeted mass is cooled, ground and screened to the desired particle size.

A representative sample of a molding composition produced as above described has a bulk density of 8.25 grams per square inch. The plasticity was satisfactory. When molded into the form of discs 4 inches in diameter and ⅛ inch thick at a temperature of about 165° C. and under a pressure of approximately 2000 pounds per square inch, the mass cured to the infusible insoluble state in 2 minutes. Under the heat and pressure of molding a hard, resinous condensation product of aniline and furfural with the lignin of the hydrolyzed wood is formed conjointly with the conversion of the phenol-formaldehyde resin to the C-stage. The cured product was extracted from the mold without difficulty and without cooling the mold. The molded article had a good finish. The A. S. T. M. Charpy inpact strength on a ½" x ½" x 5" molded bar was 0.392 foot pound. The flexural (transverse) strength, A. S. T. M. method, was 6200 pounds per square inch For purpose of brevity the terms "bulk," "cure," "impact" and "flexural" will be used in the following examples in describing the properties of the respective products when tested, unless otherwise stated, as above somewhat more fully set forth.

EXAMPLE 2

The following illustrates a suitable working formula using sulfuric-acid-hydrolyzed wood, the acid being used in an amount corresponding to 1 per cent by weight of the wood:

| | Parts by weight |
|---|---|
| Sulfuric-acid-hydrolyzed wood (containing 15% moisture) | 200 (net dry) |
| Compound C (described under Example 1) | 50 |
| Wood flour (containing approximately 6½ moisture) | 100 (net dry) |
| Aniline | 16 |
| Furfural | 16 |
| Dye (nigrosine) | 8 |

From 1 to 2 parts of hardening agent or of mold lubricant, or of both, of the kind described under Example 1, also may be incorporated with the above components as desired or as conditions may require. The ingredients are mixed and further processed as described under Example 1, with the exception that the time of milling on the hot rolls advantageously may be a little longer, for example about 20 seconds. A representative sample of molding composition and molded article made in accordance with the above formula showed:

| | |
|---|---|
| Bulk | 9.4 grams per cubic inch |
| Plasticity | Satisfactory |
| Cure | 2 minutes |
| Extracted from mold | Hot, no cooling required |
| Finish | Good |
| Impact | 0.3 foot pound |
| Flexural | 4700 pounds per square inch |

EXAMPLE 3

As previously mentioned it is preferred to use as the phenolic resin the aqueous reaction product of a phenol with an aqueous solution of an excess of formaldehyde in the presence of an alkaline catalyst. A suitable formula and method of making such a resin is described in the aforementioned co-pending Alexander application, Serial No. 94,800, and is as follows:

| | Parts by weight | Moles |
|---|---|---|
| 82% phenol, remainder mainly cresol | 100 | About 1 |
| Aqueous solution of formaldehyde (37½%) | 120 | 1.5 |
| Sodium carbonate | 1 | |

The phenol is charged into a steam-jacketed reaction vessel, agitation started, and the aqueous formaldehyde added thereto. The sodium carbonate dissolved in, for instance, about 2 parts by weight of water is added to the reaction vessel while continuing the stirring. The contents of the vessel is indirectly heated by turning steam into the jacket of the kettle until a temperature of about 60° to 65° C. is reached. The steam is now turned off the jacket and the reaction allowed to proceed further under reflux for about 30 minutes. This is a period of time insufficient to cause separation of the mass into two phases, that is into resinous and aqueous layers. During this time a temperature as high as about 94° to 98° C. may be reached. The resulting product is a clear, homogeneous aqueous solution of resinous material comprising mainly phenol alcohols. It contains about 50 to 56 per cent by weight of curing (potentially hardening) resin and substantially all the water formed during the reaction and introduced with the reactants.

In making this resin other phenolic bodies may be used in place of pure or commercial phenol, for example, substituted phenols such as cresols, xylenols, para-phenyl phenol, para-tertiary-butyl phenol, para-tertiary-amyl phenol, and the like. Mixtures of phenolic bodies, such as mixtures of phenols and cresols may be used, but care must be exercised to prevent separation of the phenolic bodies in the aqueous medium. Instead of aqueous formaldehyde, aqueous solutions of other aldehydes may be used such, for instance, as aqueous solutions of furfural and acetaldehyde. In all cases the mole ratio of the aldehyde to the phenol is in excess of 1 mole aldehyde to 1 mole phenol. For example, the aldehyde may be only slightly in excess, such as 1.05 to 1.00, or the aldehyde may be very substantially in excess, for instance about 1.7 to 1.0. Other alkaline catalysts may be used in place of sodium carbonate, although sodium carbonate is the preferred catalyst. For example, such catalysts may be used as, for instance, the hydroxides of the alkali metals, as well as carbonates of the alkali metals other than sodium. A resin prepared as above described, using sodium carbonate as the catalyst, is referred to in the formula which follows as "aqueous resin No. 1."

```
                                        Parts by weight
Sulfuric-acid-hydrolyzed wood
  (specifically maple wood), con-
  taining about 12% water_____   300  (net dry)
Aqueous resin No. 1 (containing
  about 54.2% curing resin)_____  110.5 (net dry)
```

From 1 to 2 parts of hardening agent or of mold lubricant, or of both, of the kind described under Example 1, also may be incorporated with the above components as desired or as conditions may require. The ingredients are mixed and further processed as described under Example 1, with a milling time on the hot rolls of, for instance, about 15 to 20 seconds.

During milling of the ingredients and the molding under heat and pressure of the plastic mass, any unreacted phenol and aldehyde will react with the lignin of the hydrolyzed wood. It is also probable that the phenol alcohols react with the lignin to form hard, resinous condensation products. Regardless of the exact reactions which take place between the components, the fact remains that use of such aqueous resin results in the molded articles having strength and other properties comparable in substantially all ways with conventional wood-flour-filled phenolic-resin molding compositions, but which can be prepared at a materially lower cost.

A representative sample of molding composition and molded article made in accordance with the above formula showed:

```
Bulk_____9.45 grams per cubic inch
Plasticity_____Satisfactory
Cure_____1 minute
Extracted from mold_Hot, no cooling required
Finish_____Good, somewhat better than
                       molded products of Ex-
                       amples 1 and 2
Impact_____0.67 foot pound
Flexural_____6950 pounds per square inch
Specific gravity_____1.40
```

EXAMPLE 4

```
                                        Parts by weight
Sulfuric-acid-hydrolyzed wood
  (containing about 12% water)_  300  (net dry)
Aqueous resin No. 1 (containing
  about 54.2% curing resin)_____  99.4 (net dry)
Glycerine_____   18
```

The above ingredients are ball-milled together for approximately 1 hour, worked on hot rolls for about 15 to 20 seconds at 110° to 115° C., after which the densified sheet material is cooled, ground and screened to the desired particle size. From 1 to 2 parts of hardening agent or of mold lubricant, or of both, of the kind described under Example 1, also may be incorporated with the above components as desired or as conditions may require.

A representative sample of molding composition and molded article made in accordance with the above formula showed:

```
Bulk_____9.9 grams per cubic inch
Plasticity_____Satisfactory
Cure_____2 minutes
Extracted from mold_Hot, no cooling required
Finish_____Good, somewhat better than
                       molded products of Ex-
                       amples 1 and 2
Impact_____0.603 foot pounds
Flexural_____6840 pounds per square inch
Specific gravity_____1.40
Shrinkage_____16 mils per inch
```

The shrinkage is the difference between the cold mold dimensions and the dimensions of the hot molded article, which is usually the ½" x ½" x 5" bar used for impact strength and other tests.

EXAMPLE 5

An aqueous resin was prepared as described under Example 1 with the exception that sodium hydroxide was used as the catalyst. In the following formula this resin is described as "aqeous resin No. 2."

```
                                        Parts by weight
Aniline-hydrolyzed wood (contain-
  ing approximately 12% moisture,
  20% aniline being used in hy-
  drolyzing the wood)_____  200 (net dry)
Wood flour (containing approxi-
  mately 6½% moisture)_____  100 (net dry)
Aqueous resin No. 2 (containing
  approximately 50% curing
  resin) _____  100 (net dry)
Furfural _____   16
Dye (nigrosine) _____   8
```

The above ingredients are ball-milled together for 1 hour, worked on hot rolls at 110° to 115° C. for 45 seconds, after which the densified sheet material is cooled, ground and screened to the desired particle size. From 1 to 2 parts of hardening agent, or of mold lubricant, or of both, of the kind described under Example 1, also may be incorporated with the above components as desired or as conditions may require.

A representative sample of molding composition and molded article made in accordance with the above formula showed:

| | |
|---|---|
| Bulk | 9.75 grams per cubic inch |
| Plasticity | Satisfactory |
| Cure | 1 minute |
| Extracted from mold | Hot, no cooling required |
| Finish | Good |
| Impact | 0.675 foot pound |
| Flexural | 5680 pounds per square inch |
| Shrinkage | 12 mils per inch |

The marked improvement in properties between molding compositions of this invention and molding compositions similarly made from aniline- or acid-hydrolyzed wood but containing no added, separately prepared phenol-formaldehyde resin is shown by a comparison of the properties of the compositions shown under the above examples and the tabulated data below:

| Compound | Bulk density | Plasticity | Cure | Strength of molded article | |
|---|---|---|---|---|---|
| | | | | Impact in ft. lbs. | Flexural in lbs./sq. in. |
| Molding composition from aniline-hydrolyzed wood, using 20% aniline | 5.7 | Poor | None | 0.3 | 1,525 |
| Molding composition from sulfuric-acid-hydrolyzed wood, using 1.2% acid | 7.5 | Poor | None | 0.25 | 3,488 |

In general molding compositions produced in accordance with the present invention will have a bulk density of at least 8 grams per cubic inch. This density is determined by weighing the mass that uniformly has been loaded into a container having a capacity of 1 cubic inch. The molded articles will show a Charpy impact strength (½" x ½" x 5" bar) not less than 0.3 foot pound when made from acid-hydrolyzed wood and not less than 0.36 foot pound when produced from aniline-hydrolyzed wood. When made from either of the said types of hydrolyzed wood they will show a flexural strength of at least 4500 pounds per square inch and a shrinkage not exceeding 16 mils per inch. The molded articles also, in general, will show a dielectric strength in oil at 100° C. of at least 35 volts per mil, and a water-absorption (A. S. T. M. method, 48-hour test) not exceeding 3 per cent.

When the preferred phenolic resin component is employed, viz., the aforedescribed aqueous phenolic resin solution, molded parts are made which in general show a Charpy impact strength of at least 0.5 foot pound, a flexural strength of at least 5000 pounds per square inch, a dielectric strength in oil at 100° C. from 35 to 100 volts per mil, and a water absorption (A. S. T. M. method, 48-hour test) not exceeding 1.5 per cent.

What I claim as new and desire to secure by Letters Patent of the United States is:

1. A heat-hardenable molding composition comprising an intimate mixture of ingredients comprising acid-hydrolyzed wood, at least 10% by weight thereof of a potentially heat-hardenable phenol-aldehyde resin and, in addition, aniline.

2. A heat-hardenable molding composition adapted to be extracted hot from a mold, said composition comprising an intimate association of acid-hydrolyzed wood, at least 10 per cent by weight thereof of a potentially heat-hardenable liquid resinous composition obtained by reacting a phenol with an aqueous solution of an excess of formaldehyde in the presence of an alkaline catalyst, and, in addition, to said components, furfural and aniline, in an amount corresponding to from approximately 5 to 20 per cent by weight of the net dry hydrolyzed wood.

3. A heat-hardenable molding composition comprising aniline-hydrolyzed wood, at least 10 per cent by weight thereof of a potentially heat-hardenable phenol-aldehyde resin and, in addition, a relatively small amount of furfural.

4. A molded article comprising the hardened molding composition of claim 1.

5. A molded article comprising the hardened molding composition of claim 2.

6. A molded article comprising the hardened molding composition of claim 3.

7. The method of preparing a molded resinous article which comprises incorporating into aniline-hydrolyzed wood furfural and at least 10 per cent by weight of the hydrolyzed wood of a resinous material comprising a heat-hardenable phenol-aldehyde partial condensation product, sheeting the resulting mass on hot rolls, grinding the sheeted product, incorporating the ground product into a molding composition adapted to be hardened under heat and pressure, and molding and hardening said molding composition under heat and pressure.

8. A heat-hardenable molding composition comprising aniline-hydrolyzed wood, at least 10 per cent by weight thereof of a potentially heat-hardenable phenol-formaldehyde resin and, in addition, furfural and a polyhydric alcohol, said furfural and polyhydric alcohol being added in an amount sufficient to impart the desired plasticity to the said composition.

9. A heat-hardenable molding composition comprising, by weight, approximately 200 parts aniline-hydrolyzed wood, approximately 100 parts wood flour, approximately 100 parts of a potentially heat-hardenable phenol-formaldehyde resin and approximately 16 parts furfural.

10. A heat-hardenable molding composition comprising aniline-hydrolyzed wood, a liquid resinous mass comprising a heat-hardenable phenol-aldehyde partial condensation product in an amount corresponding to from 10 to 60 parts by weight resin base to 100 parts by weight of net dry hydrolyzed wood and, in addition, from 5 to 20 parts by weight of furfural for each 100 parts by weight of net dry hydrolyzed wood.

11. The method which comprises incorporating into a lignin-containing hydrolyzed wood at least 10 per cent by weight thereof of a separately prepared, potentially hardening phenol-aldehyde resin and causing the lignin present in the said hydrolyzed wood to resinify under heat concomitantly with the advancement of the said phenol-aldehyde resin to an insoluble, infusible state.

EDMOND F. FIEDLER.